United States Patent Office 3,795,707
Patented Mar. 5, 1974

3,795,707
MANUFACTURE OF α-6-DEOXYTETRACYCLINES
Franco Paolo Luciano, Bassi, Italy, assignor to Rachelle Laboratories Italia S.p.A., Milan, Italy
No Drawing. Filed Dec. 28, 1970, Ser. No. 102,094
Int. Cl. C07c 103/19
U.S. Cl. 260—559 AT       4 Claims

ABSTRACT OF THE DISCLOSURE

α-6-deoxytetracyclines are recovered in purified form by reacting the corresponding α-6-deoxytetracycline sulfosalicylates with at least about two equivalents of a base at a pH of about 5.5 to about 9.0 and at a temperature of less than about 90° C.

BACKGROUND OF THE INVENTION

The α-6-deoxytetracyclines are a class of tetracyclines which have chemical, physical and biological properties distinct from 6-deoxytetracyclines by virtue of their altered stereochemical configuration. They possess microbiological activity against a variety of Gram-positive and Gram-negative microorganisms.

As described, for example, in U.S. Pat. 3,200,149 and in 85 J.A.C.S. 2643–2651 (1963), the α-6-deoxytetracyclines are produced by dissolving or suspending an appropriate 6-methylenetetracycline in the amphoteric form, or as an acid addition salt or polyvalent metal salt complex thereof, in a reaction inert solvent medium in the presence of a catalytic amount of an appropriate hydrogenation catalyst and contacting the mixture with hydrogen at a suitable temperature and pressure until reduction of the 6-methylene group occurs. The resulting product is a mixture of the α-6-deoxytetracycline and 6-deoxytetracycline. The α-epimer is recovered from the reaction mixture in the form of its sulfosalicylate salt.

The 6-methylenetetracyclines utilized in the preparation of the α-6-deoxytetracyclines may be prepared as described in the aforesaid patent, or, preferably as disclosed in my copending application Ser. No. 101,688, filed concurrently herewith and entitled "Manufacture of 6-Methylenetetracyclines," now abandoned.

Difficulties have been encountered in the art in purifying the crude α-6-deoxytetracycline sulfosalicylates prepared as described above and converting the same to the corresponding pharmaceutically useful amphoteric bases or hydrochloride salts in purities sufficient to meet recognized standards. The use of countercurrent solvent distribution for separation of the α-6-deoxy and 6-deoxy epimers of the amphoteric bases is proposed in the aforesaid U.S. Pat. No. 3,200,149, whereas recrystallization of the sulfosalicylates from methanol followed by reaction with triethylamine is suggested in the cited J.A.C.S. paper. These and other prior purification techniques have, however, been critized as tedious to perform or productive of only poor product yields. See British Pat. No. 1,122,480. This patent proposes yet a further procedure for purifying the sulfosalicylate salts of the α-6-deoxytetracyclines, viz., direct formation of the hydrochloride salts thereof by recrystallization of the sulfosalicylates from methanolic hydrochloric acid followed by conversion of the recrystallized product to the hydrochloride in ethanolic HCl.

It is among the objects of the present invention to provide an improved method for the production of α-6-deoxytetracyclines from their crude sulfosalicylate salts, and the recovery and purification of such pharmaceutically useful products in high yields and purities. These and other objects of the invention will become apparent to one skilled in the art from the following detailed descriptions of preferred forms thereof.

SUMMARY OF THE INVENTION

This invention relates to a method of preparing α-6-deoxytetracycline compounds. More particularly, the invention relates to a porcess of reacting α-6-deoxytetracycline sulfosalicylates with at least two equivalents of a base at a pH of about 4.5 to about 8.5 and at a temperature of less than about 90° C. The corresponding α-6-deoxytetracycline bases are thus directly formed in high yields and purities. Hence, while crude sulfosalicylates of less than about 40% purity (defined herein by the FDA titer [see the Code of Federal Regulations, Title 21, Part 148z], viz., the weight percent of the tetracycline in the material analyzed, calculated as the base; in the case of α-6-deoxy-5-oxytetracycline the pure sulfosalicylate salt thereof contains 63.6 weight percent of the α-6-deoxy-5-oxytetracycline base, or has a 63.6% titer) cannot be converted to the corresponding bases in useful yields and purities employing the purification technique described, for example, in the aforesaid J.A.C.S. paper, the purification operations of the present invention may be utilized to recover products in yields of over 50% and titers of over 85% from crude sulfosalicylates having even lesser purities (see Example 1 and Control A below).

DESCRIPTION OF THE PREFERRED EMBODIMENTS

The process of this invention is applicable to the production of the α-6-deoxytetracycline amphoteric bases and of the hydrochlorides and hyclates (the hemihydrate hemiethanolates) thereof. Typical α-6-deoxytetracycline bases which may be so prepared include α-6-deoxy-5-oxytetracycline,
α-6-deoxy-7-chloro-5-oxytetracycline,
α-6-deoxy-11a-fluoro-5-oxytetracycline,
α-6-deoxy-9-nitro-5-oxytetracycline,
α-6-deoxy-9-amino-5-oxytetracycline,
α-6-deoxy-9-acetylamino-5-oxytetracycline,
α-6-deoxy-7-chloro-11a-fluoro-5-oxytetracycline,
α-6-deoxy-7-amino-5-oxytetracycline and the like.

Preferably, the recovery and purification process hereof is utilized in the synthesis of α-6-deoxy-5-oxytetracycline (doxycycline) from 6-methylene-5-oxytetracycline (methacycline). While the following description and specific examples are principally in terms of such synthesis, it should be understood that the process hereof may also be utilized in connection with the recovery and purification of other α-6-deoxytetracyclines, such as those listed above.

The sulfosalicylate salts employed in the process of the invention may be derived from 6-methylenetetracyclines synthesized in any suitable manner, e.g., as described in the aforesaid U.S. Pat. No. 3,200,149 or the cited J.A.C.S. paper or, preferably, as disclosed in my above-identified copending application. Similarly, the methylenetetracycline may be hydrogenated and reacted with sulfosalicylic acid in any convenient way, whether as described in the aforementioned works or, for example, employing particular hydrogenation techniques such as described in U.S. Pat. No. 3,444,198. The sulfosalicylate salts produced by any of the above methods are suitable for use in the present process.

For example, in the preparation of doxycycline base, methacycline may be hydrogenated by reaction over a platinum metal group hydrogenation catalyst (e.g., Pd/carbon or PtO$_2$) to the epimers α-doxycycline α-6-deoxy-5-oxytetracycline) and β-doxycycline (β-6-deoxy-5-oxytetracycline). The sulfosalicylate salt of the epimer is then obtained by reacting the epimeric mixture with sulfosalicylic acid whereby the alpha salt crystallizes out of solution and most of the beta epimer remains in solution. The crystallized alpha sulfosalicylate salt is contaminated with epimer, starting reactants and hydrogenation byproducts, and must then be converted to the amphoteric doxycycline base or other useful pharmaceutical form thereof in accordance with the process hereof.

The doxycycline base can be obtained in good yield and purity directly from the crude sulfosalicylate salt by the process of this invention without the necessity of further purification of the salt by recrystallization. If it is desired to obtain the base in higher yields and purities the sulfosalicylate salt may, however, be further purified before proceeding, e.g., by refluxing the same at least once in alcoholic hydrogen chloride or, preferably, by refluxing the salt in methanolic hydrogen chloride, filtering the solution and then refluxing the product in ethanolic hydrogen chloride to recrystallize the purified salt.

The doxycycline is obtained in accordance herewith by reacting the doxycycline sulfosalicylate (which can, as noted above, be in either the crude or purified forms described) with at least about two equivalents of base. Each mole of the doxycycline sulfosalicylate is thus reacted with at least about 2 moles of any mono-substituted base, e.g., sodium hydroxide or triethylamine, or with at least about 1 mole of any di-substituted base, e.g., sodium carbonate. Preferably, the base is added to a suspension of the sulfosalicylate.

The reaction temperature is maintained below about 90° C., e.g., at temperatures of from room temperature (about 20° C.) up, preferably from about 50° to 90° C., and most desirably from about 60° to about 70° C.

In the case of the recovery of doxycycline, the reaction with the sulfosalicylate salt is carried out in water, the pH of the reaction mixture being maintained at between about 5.5 and 8.5. At pH values above about 8.5, it has been found that a water-soluble salt is formed. Best results are obtained when the pH of the aqueous reaction medium is maintained at about pH 6.5–7.5. Employing the indicated reaction temperatures and pH values, and conducting the reaction in a water medium, it has been found possible to readily recover doxycycline base in high yields and purities.

In some instances, e.g., in the synthesis of 7-chloro-doxycycline (7-chloro-α-deoxy - 5 - oxytetracycline), it is possible to recover the desired doxycycline base by reaction at somewhat higher pH values, preferably at a pH of up to 9.0. It has been found that, as in the case of doxycycline base, the 7-chloro-doxycycline base may be produced in high yield in aqueous reaction media. It is, however, preferred to utilize methanol-water media for recovering the 7-chloro-doxycycline in both high yields and purities, particularly good results having been obtained by reaction in methanol-water media containing from about 30 to 70% by weight water.

By proceeding as indicated above, maintaining the temperature and acidity conditions within the critical ranges specified and reacting each mole of sulfosalicylate salt with at least about 2 equivalents of base, the doxycycline or other α-6-deoxytetracycline base precipitates from the solution and is readily recovered in high purities and yields. When, on the other hand, the neutralization is carried out under other temperature and/or acidity conditions it has been found that the doxycycline or other α-deoxytetracycline base remains partially dissolved and precipitates in markedly lower yields and at substantially poorer purities.

Among the bases which can be employed to neutralize the sulfosalicylate salts are the alkali metal and alkaline earth metal carbonates, bicarbonates and hydroxides, such as sodium carbonate, potassium carbonate, calcium carbonate, magnesium carbonate, barium carbonate, sodium bicarbonate, calcium bicarbonate, magnesium bicarbonate, lithium hydroxide, sodium hydroxide, and potassium hydroxide, whether in the anhydrous or hydrated forms, and the like; and organic bases including primary, secondary and tertiary organic amines, e.g., triethylamine, triethanolamine, pyridine, and the like. The preferred base is sodium carbonate. The alkaline earth metal bases, e.g., the various calcium salts specified above, are less preferred because of their tendency to form an insoluble complex in the reaction mixture.

The doxycycline base thus formed is recovered from the reaction mixture by conventional means, such as by filtering, and can thereafter be washed with water, acetone and the like, and dried. If desired, the product can be converted to the hydrochloride and/or hyclate by processes known in the art.

The following examples serve to illustrate the invention but are not intended to limit it. Unless otherwise specified, all temperatures are in ° C. and all parts are understood to be expressed in parts by weight.

EXAMPLE 1

Doxycycline base prepared from crude doxycycline sulfosalicylate

A suspension of 4.8 kg. of methacycline hydrochloride, 9 liters of methanol, 0.19 liter of concentrated HCl, 0.96 liter of distilled water and 0.48 kg. of $PtO_2$ was placed in a hydrogenation reactor. The pressure was increased to 100 atmospheres at a temperature of 15–20° C. under agitation. After about 1.5 hours, the hydrogenation was complete. The catalyst was filtered out of the solution and thereafter 1.22 kg. of sulfosalicyclic acid and 24 liters of water were added to the hydrogenated solution. The solution was stirred for about 2 hours at 5° C. The precipitate thus formed was recovered by filtration, washed with water, refiltered and then dried in hot air. The doxycycline sulfosalicylate was produced with an FDA titer (determined by chromatographic analysis) of 37.2%.

A portion of the crude doxycycline sulfosalicylate prepared as described above was converted to doxycycline base in accordance with the process of the present invention. 17 grams of the crude salt was thus reacted with 7.0 grams of sodium carbonate ($Na_2CO_3 \cdot 10H_2O$) in 95 ml. of $H_2O$. The reaction mixture was maintained at a temperature of 75° C. and at a pH of 7.4. 3.8 grams of doxycycline base (a 52% yield) having an FDA titer of 86.8% was thus recovered.

A control experiment (Control A) was carried out on an additional portion of the crude doxycycline sulfosalicylate, utilizing the procedure described in 85 J.A.C.S. 2643, 2648. 17 grams of the crude sulfosalicylate was thus suspended in 125 ml. of methanol, stirred and treated with triethylamine until dissolved therein. The solution, having a pH of 4.8, was diluted with 50 ml. of water and adjusted to a pH of 5.7. 0.35 gram of doxycycline base (a yield of 2.4%, having an FDA titer of 43.6%) was recovered by crystallization from the reaction mixture.

EXAMPLE 2

Doxycycline base prepared from twice recrystallized doxycycline sulfosalicylate

A further portion of the crude sulfosalicylate salt (102 grams) prepared as described in Example 1 was suspended in 510 ml. of methanol containing 51 grams of HCl gas (10%). 10.2 grams of activated charcoal were added to the mixture and the suspension was refluxed with stirring for 2 hours. The resulting reaction mixture was filtered while hot, the filter cake was washed with methanol, and the washings were added to the solution. 20.5 grams of sulfosalicylic acid in 205 ml. of water was added to the solution and the mixture maintained at a temperature of from 5° to 10° C. with stirring for a further 3–4 hours. The recrystallized sulfosalicylate product thus obtained was recovered by filtration, washed in water, and dried in order to obtain 68 grams (FDA titer 55.1%).

50 grams of the first recrystallized sulfosalicylate salt was further purified by recrystallization from 250 ml. of ethanol acidified with 25 grams of HCl gas. The suspension was refluxed for one hour with stirring, after which the solution obtained was filtered hot, the filter cake washed with ethanol, and the washings were added to the solution. 12.5 grams of sulfosalicylic acid in 125 ml. of water was added to the filtrate, which was maintained at a temperature of from 5° to 10° C. with stirring for an additional 34 hours. The twice recrystallized sulfosalicylate product thus obtained was washed in water, filtered and dried.

45 grams of the α-6-deoxy-5-oxytetracycline sulfosalicylate having an FDA titer of 59.2% was thus obtained.

A portion of the twice recrystallized doxycycline sulfosalicylate was subsequently converted to doxycycline base in accordance with the process of the present invention. 8 grams of the purified sulfosalicylate salt was thus reacted with 3.5 ml. of triethylamine (equivalent to a sulfosalicylate:triethylamine molar ratio of 1:2) in 40 ml. of $H_2O$. The reaction mixture was maintained at a temperature of 18°–20° C. and at a pH of 7.2. 4.3 grams of doxycycline base (an 86.2% yield), having an FDA titer of 94.9%, was thus recovered.

A control experiment (Control B) was carried out on an additional portion of the twice recrystallized doxycycline sulfosalicylate prepared as described above, utilizing the procedure described in 85 J.A.C.S. 2643, 2648. 8 grams of the purified sulfosalicylate salt was thus reacted with 2.6 ml. of triethylamine in 59 ml. of methanol, the reaction mixture reaching a pH of 6.9. 23 ml. of $H_2O$ was then added. The acidity of the reaction mixture reached 6.4 and was adjusted to 5.7. 3.8 grams of doxycycline base (yield of 74.7%), having an FDA titer of 93.2%, was recovered by crystallization from the reaction mixture.

The product yields and purities obtained by the techniques of Examples 1 and 2, and by the control procedures described in the cited J.A.C.S. paper and carried out as set forth in Controls A and B, are tabulated below:

| Example or control | Doxycycline sulfosalicylate reacted | Percent Yield of doxycycline base | Percent Purity of doxycycline base (FDA titer) |
| --- | --- | --- | --- |
| Example 1 | Crude (37.2% titer) | 52 | 86.8 |
| Control A | do | 2.4 | 43.6 |
| Example 2 | Twice recrystallized (59.2% titer). | 86.2 | 94.9 |
| Control B | do | 74.7 | 93.2 |

As is evident from the table, unlike the J.A.C.S. procedure, the process of the present invention may be employed to recover doxycycline base in substantial yields and high purities from even crude doxycycline sulfosalicylates having purities under 40%. Moreover, the process hereof provides markedly increased yields and higher purities of doxycycline than obtained by use of the prior art technique, even after successive purifications of the sulfosalicylate intermediate.

EXAMPLE 3

Doxycycline base prepared from twice recrystallized doxycycline sulfosalicylate 3.3 grams of sodium carbonate decahydrate was admixed with 8 grams of the twice recrystallized sulfosalicylate (equivalent to a sulfosalicylate:sodium carbonate molar ratio of 1:1) of Example 2 in 40 ml. of water at a temperature of 75° C. The pH of the reaction mixture was maintained at 7.2. 4.1 grams of doxycycline base (81.5% yield), having an FDA titer of 93.9% was obtained.

EXAMPLE 4

Doxycycline base prepared from twice recrystallized doxycycline sulfosalicylate

Sufficient 1 N caustic soda was added to a suspension of 8 grams of the twice recrystallized sulfosalicylate of Example 2 in 40 ml. of water to provide a pH of 7.5 at a temperature of 18–20° C. Doxycycline base was recovered in 84% yield, with an FDA titer of 94.5%.

EXAMPLE 5

Doxycycline base prepared from twice recrystallized doxycycline sulfosalicylate

A suspension of 8 grams of the twice recrystallized doxycycline sulfosalicylate of Example 2 in 40 ml. of water was prepared. 3.6 ml. of triethylamine (equivalent to a sulfosalicylate:triethylamine molar ratio of 1:2) was added to the suspension and the temperature maintained at 75° C. The pH was 7.4. The resulting doxycycline base was recovered in an amount of 4.25 grams (85.2% yield), with a FDA titer of 94.9%.

EXAMPLE 6

7-chloro-α-6-deoxy-5-oxytetracycline from 7-chloro-6-methylene-5-oxytetracycline A suspension of 53 grams of 7,11-α-dichloro-6-methylene-5-oxytetracycline hydrofluoride in 106 ml. of methanol acidified with 4.25 ml. HCl was catalytically hydrogenated in the presence of 4.8 grams of $PtO_2$ catalyst in the manner set forth in Example 1 above. The hydrogenation was carried out at a temperature of 20–25° C. and a pressure of 50–70 atmospheres. After completion of the hydrogenation, the crude product was recovered as the 7-chloro-doxycycline sulfosalicylate in the same manner as described in Example 1.

The crude sulfosalicylate was dissolved in 0.2 liter methanol/water (1:1) by adding triethylamine to pH 6.5–7. A filter aid was then added, the solution filtered and thereafter acidified with p-toluene sulfonic acid at room temperature to pH 0.6–0.8. The mixture was stirred at 5° C. for three hours, filtered and washed with 0.15 liter acetone. The p-toluene sulfonate of the 7-chloro-doxycycline was thus obtained. Such product was thereafter dissolved in five times its weight of acidified methanol (containing 20–30% HCl).

The resulting 7-chloro-doxycycline hydrochloride was precipitated by the addition of 1.5–2 liters ether, filtered, washed with ether and dried. The product exhibited ultra-violet absorption maxima at 265λ and 345–350λ in methanol-0.01 N HCl. The yield of the 7-chloro-doxycycline base was about 18–20%.

Various changes and modifications can be made in the process hereof without departing from the spirit and scope of the invention. The various preferred embodiments disclosed serve to further illustrate the invention but are not intended to limit it.

I claim:

1. A process for the preparation of α-6-deoxy-5-oxytetracycline from a mixture of the α- and β-epimers of 6-deoxy-5-oxytetracycline sulfosalicylate which comprises neutralizing the α-epimer with two moles of sodium hydroxide per mole of the sulfosalicylate at a temperature of from 20° to 90° C. and at pH values of from 5.5 to 8.5.

2. The process of claim 1, wherein the epimeric mixture is obtained by hydrogenating 6-methylenetetracycline and reacting the resulting product with sulfosalicylic acid.

3. The process of claim 1, wherein the temperature is 50° C. to 90° C.

4. The process of claim 1, wherein the neutralization is carried out in aqueous reaction media and at pH values of from 6.5 to 7.5.

References Cited

UNITED STATES PATENTS 2,997,471  8/1961  Cheney et al. ____ 260—559 AT

DONALD G. DAUS, Primary Examiner

A. M. T. TIGHE, Assistant Examiner